Nov. 11, 1969   H. L. GREGORICH ET AL   3,477,250
ANCHOR TOOTH SPLINE FOR ROTATING GEAR MECHANISMS
Filed June 20, 1968   3 Sheets-Sheet 1

HENRY L. GREGORICH
CLEVOE D. JONES
MARION E. PHELPS
INVENTORS:

BY John R. Faulkner
Donald J. Harrington
ATTORNEYS

Nov. 11, 1969     H. L. GREGORICH ET AL     3,477,250
ANCHOR TOOTH SPLINE FOR ROTATING GEAR MECHANISMS
Filed June 20, 1968     3 Sheets-Sheet 2

HENRY L. GREGORICH
CLEVOE D. JONES
MARION E. PHELPS
INVENTORS:

BY John R. Faulkner
Donald J. Harrington
ATTORNEYS

HENRY L. GREGORICH
CLEVOE D. JONES
MARION E. PHELPS
INVENTORS

United States Patent Office

3,477,250
Patented Nov. 11, 1969

3,477,250
ANCHOR TOOTH SPLINE FOR ROTATING GEAR MECHANISMS
Henry L. Gregorich, Bloomfield Hills, Clevoe D. Jones, Franklin, and Marion E. Phelps, Dearborn, Mich., assignors to Ford Motor Company, Dearborn, Mich., a corporation of Delaware
Filed June 20, 1968, Ser. No. 738,439
Int. Cl. F16d 3/06
U.S. Cl. 64—23
6 Claims

ABSTRACT OF THE DISCLOSURE

A torque delivery system wherein two torque delivery members are splined together by means of a series of strategically positioned anchor teeth arranged to transmit driving torque, other spline teeth of the splined connection being relieved to provide reduced tooth thickness whereby a piloting action occurs either between the major diameter of the internal spline teeth and the major diameter of external spline teeth or between the minor diameter of the internal spline teeth and the minor diameter of the external spline teeth.

REFERENCE TO RELATED APPLICATION

This application is a continuation-in-part of co-pending application Ser. No. 704,868, filed Feb. 12, 1968.

GENERAL DESCRIPTION OF THE INVENTION

Our invention comprises a geared torque delivery mechanism in which a torque delivery gear is splined to a torque delivery shaft and is adapted to be moved axially thereon. It is adapted especially to be used with manually-controlled, multiple-ratio, power transmission mechanisms. In one such environment a splined gear forms a part of a multiple-ratio gear assembly which establishes either a low speed ratio or a reverse drive ratio as torque is delivered to the drive shaft upon movement of the internally splined gear in either one direction or the other.

There is a tendency in environments of this type for the internally splined gear to be shifted axially on the shaft during torque delivery because of the normal skewing of the gear with respect to the spline teeth and the resulting axial progression of the gear as the spline teeth alternately are loaded and unloaded during rotation. Certain inaccuracies in the profiles of gears, including spur gears, tend to produce this condition.

The axial progression of such internally splined gears is aggravated by locating the internally splined hub of the gear in an offset, axial location with respect to the gear teeth. In some instances, when a torque reversal occurs, it is possible for the meshing gears to "jump out" of engagement due to the shifting tendency of one gear with respect to the other.

Our invention overcomes these difficulties by means of a relief on the flanks of the spline teeth and a piloting action of the external spline with respect to the internal spline through the use of either a major or a minor diameter sliding fit.

In conventional prior art mechanisms the corresponding spline tooth fit occurs on the pitch diameter. In contrast, continuous contact then occurs in our improved spline teeth between the unrelieved, full-thickness, external teeth and the mating internal teeth. Alternate loading and unloading of the spline teeth then is avoided, and the "walking" tendency of the gear with respect to the spline shaft is eliminated.

In a preferred form of our invention, an internally splined synchronizer sleeve carried by an externally splined hub establishes a driving connection between the drive shaft and the power input gear as the sleeve is shifted in one direction. A driving connection between the drive shaft and the intermediate ratio gear occurs when the sleeve is shifted in the opposite direction. The improved spline-lock teeth of our invention can be applied as well to the registering spline teeth of the synchronizer hub and the sleeve so that the sleeve will not shift axially due to the axial force component caused by skewing action of the sleeve with respect to the hub.

PARTICULAR DESCRIPTION

Figure 1:
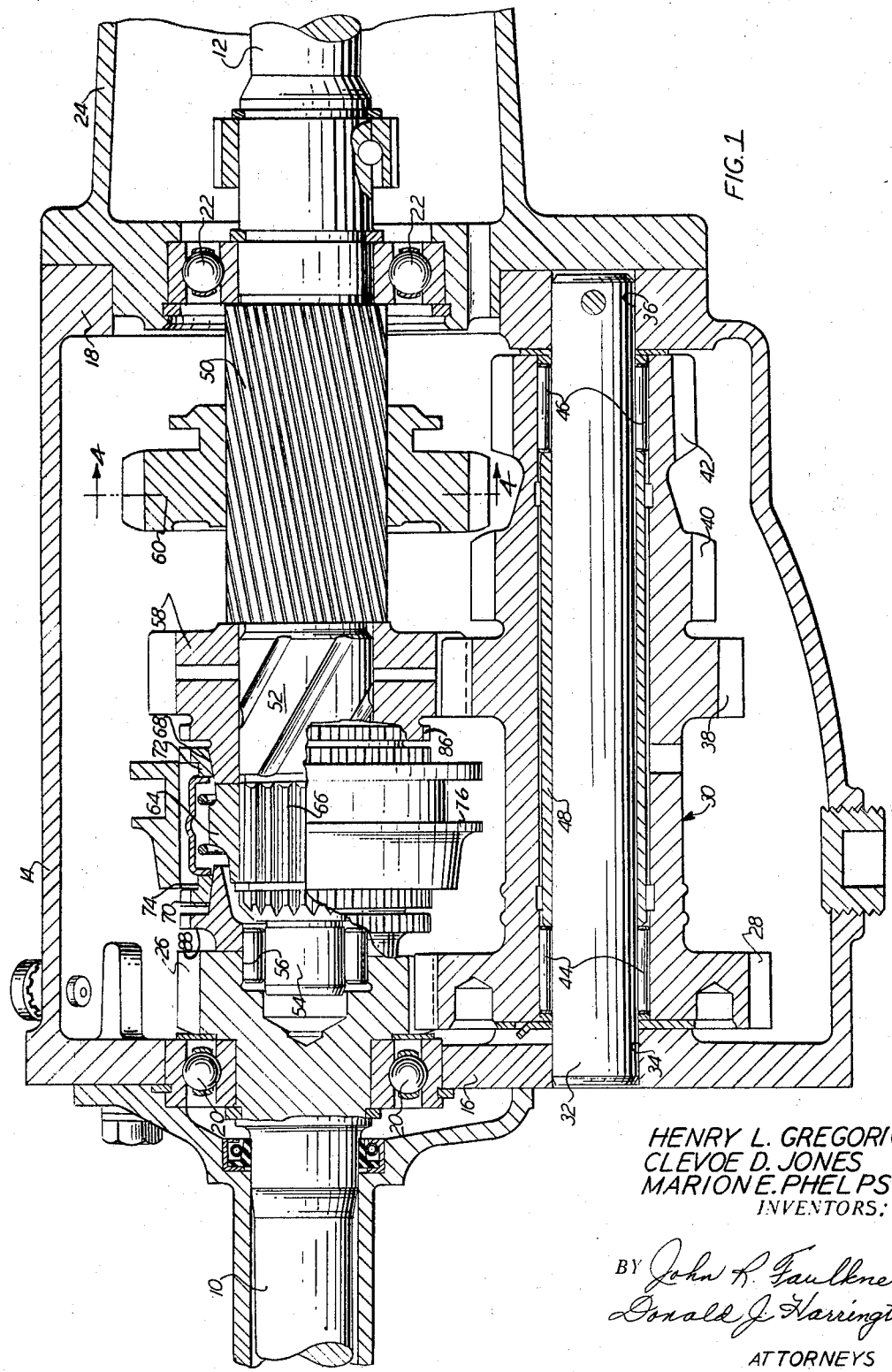
FIGURE 1 shows in longitudinal cross sectional form a geared transmission mechanism capable of employing the improvements of my invention.

In FIGURE 1, numeral 10 designates the power input shaft for the transmission mechanism. Numeral 12 designates the driven shaft, which is connected to the driveshaft of an automotive vehicle driveline.

Shaft 10 is adapted to be connected to the power output element of a driver controlled neutral clutch, the latter establishing a driving connection between the internal combustion engine of the vehicle driveline and the shaft 10.

Numeral 14 designates the transmission housing. It includes a forward wall 16 and a rearward wall 18. Shaft 10 is journalled by means of bearing 20 within a bearing opening in the forward wall 16. Shaft 12 is journalled by means of bearing 22 within the bearing opening formed in tailshaft extension housing 24, the latter being joined to the wall 18 of the housing 14.

Shaft 10 is connected directly to power input gear 6, which meshes continuously with gear element 28 of the cluster gear assembly 30. The assembly 30 is journalled rotatably on a countershaft 32 spaced in parallel disposition with respect to the common axis of shafts 10 and 12. Shaft 32 is supported in openings 34 and 36 in the walls 16 and 18. The cluster gear assembly includes, in additional to the gear element 28, intermediate gear element 38, low speed ratio gear element 40, and reverse drive gear element 42. Cluster gear assembly 30 is mounted for rotation on the shaft 32 by spaced bearings 44 and 46 which are held in axially spaced relationship by means of sleeve 48.

Shaft 12 has a portion 50 that is formed with a helical spline. Adjacent the helical spline is a bearing portion 52. The left-hand end of the shaft 12 forms a pilot 54 which is journalled within the bearing recess 56 formed in the input gear 26.

An intermediate gear 58 is journalled on the bearing portion 52. It meshes continuously with the gear element 38.

Figure 2:
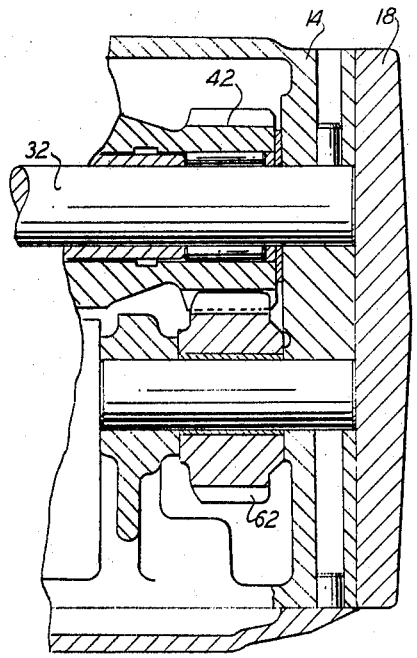
FIGURE 2 is a sub-assembly view of the reverse drive pinion for the mechanism of FIGURE 1.

The low-and-reverse sliding gear 60 is splined to the helical splines 50 and is adapted to slide thereon into meshing engagement with the low speed gear element 52 or into meshing engagement with reverse drive pinion 62 shown in FIGURE 2. The position of the gear 60 shown in FIGURE 1 is a neutral position in which neither gear element 40 nor reverse drive pinion 62 is engaged.

Figure 3:
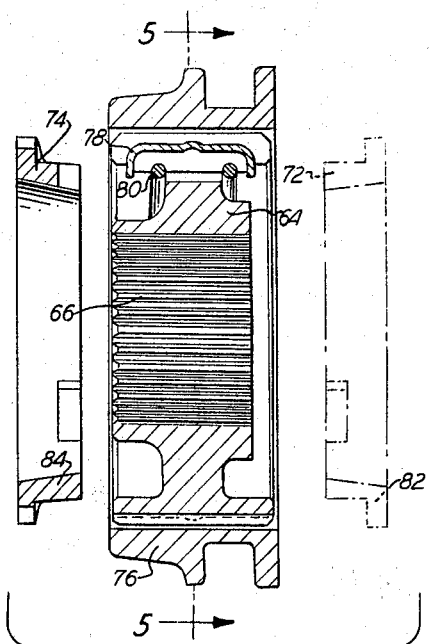
FIGURE 3 is a sub-assembly view of the synchronizer clutch in the mechanism of FIGURE 1.

A synchronizer clutch hub 64 is spline at 66 to the shaft 12. Synchronizer cone clutch surfaces 68 and 70 are formed on the gears 68 and 26 respectively. Blocker rings 72 and 74 surround the cone clutch surfaces 68 and 70 respectively. The details of the construction of the synchronizer clutch assembly are seen best in FIGURE 3.

The hub 64 is externally splined to receive an internally splined clutch sleeve 76. Thrust bars, preferably three in number, are located in angularly spaced recesses in the external spline teeth of the hub 64. One of the ends of the thrust bars 78 are received in notches formed in synchronizer ring 72 and the other ends of the thrust bars 78 are received in correpsonding notches in the synchronizer ring 74. The thrust bars 78 are urged in a radically outward direction by circular springs 80 thereby normally urging the thrust bars into engagement with the internal teeth of the sleeve 76.

A lost motion exists between the ends of the thrust bars 78 and the adjacent sides of the registering slots formed in the synchronizer rings 74 and 72. Thus, as the sleeve 76 is shifted in one direction or the other, the thrust bars will develop an axial force on the synchronizer rings which causes engagement of the associated cone clutches thereby tending to establish synchronism in the motion of the shaft 12 with respect to either the gear 26 or the gear 58. Cooperating detent parts found in the internal teeth of sleeve 76 and in the thrust bar tend to increase the axial, clutch-engaging force. While the synchronizing function is occurring, the internal clutch teeth in the sleeve 76 engage external teeth 82 and 84 formed by the synchronizer rings 72 and 74 respectively. After synchronism is established, the sleeve is shifted through the teeth of the rings 72 and 74 until the clutch teeth in the gear are engaged with the adjacent clutch teeth on the gears 58 and 26, as shown at 86 and 88 respectively.

To establish low speed ratio operation, sleeve 76 is moved to the central position shown in FIGURE 1 and the sliding gear 60 is moved in a left-hand direction so that it meshes with gear element 40. Torque then is delivered from the engine driven power input shaft 10 to gear element 28 of the cluster gear assembly 30. The torque then is delivered from gear element 40 to gear 60 and hence to the power output shaft 12. The helical spline connection between shaft 12 and the gear 60 establishes a force component in an axial direction on the gear 60 which opposes and tends to cancel the gear tooth thrust forces caused by the meshing teeth of gear element 40 and gear 60, which teeth are helical teeth as are the other gear teeth in this embodiment.

To establish an intermediate speed ratio, forward-drive condition, gear 60 is shifted to the central, neutral position shown in FIGURE 1 and synchronizer clutch sleeve 76 is shifted in a right-hand direction until gear 58 becomes locked to the shaft 12. Engine torque now is delivered from shaft 10, through input gear 26, through cluster gear element 28 and cluster gear element 38 to the gear 58. The synchronizer clutch locks gear 58 to the power output shaft 12. The pitch diameter of gear element 40 is less than the pitch diameter of gear element 38, thereby providing an increased ratio.

High speed ratio, direct-drives is established by shifting the sleeve 76 in a left-hand direction thereby locking the power input gear 26 to the shaft 12.

Reverse drive is obtained by moving the synchronizer clutch sleeve 76 to the neutral position shown in FIGURE 1 and by shifting the gear 60 in a right-hand direction until it meshes with reverse drive pinion 62. Driving torque then is delivered from shaft 10, through gear 26, through gear elements 28 and 42, through reverse drive pinion 62 and through gear 60 to the shaft 12. Pinion 62 reverses the direction of rotation of shaft 12 with respect to the direction of rotation of the engine.

Figure 4:
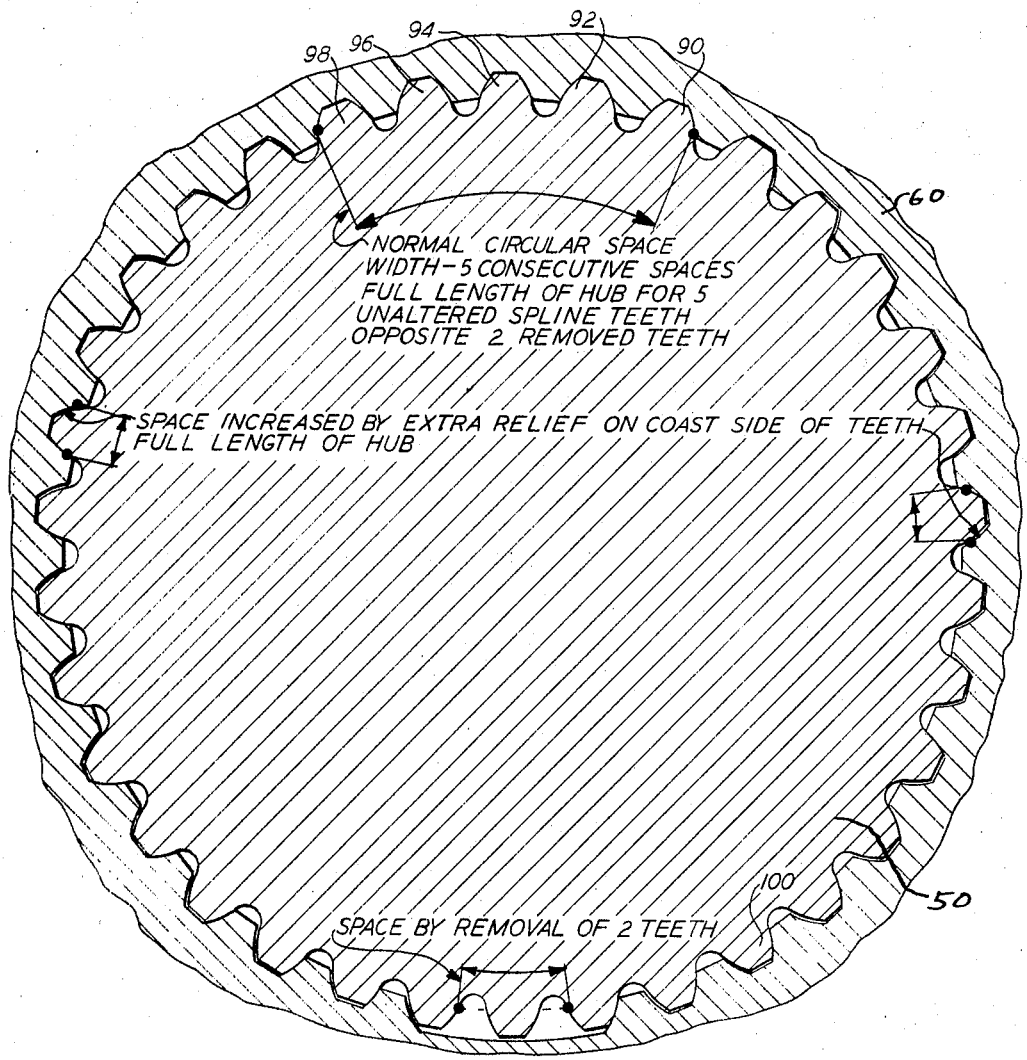
FIGURE 4 shows a cross sectional view taken along section line 4—4 of FIGURE 1.

In FIGURE 4 is shown a sub-assembly view of the gear 60 and spline connection 50 to the shaft 12. In the spline connection 50 there are 34 teeth having a circular pitch of 20. The pressure angle is 30°. The external spline teeth are shown at 90, 92, 94, 96, and 98. These teeth are formed with a full tooth width so that full contact occurs on the pitch circle between these teeth and the circular base width of the internal teeth in the gears 60. Corresponding teeth are formed on the shaft 12 at a location 180° away from the teeth 90, 92, 94, 96 and 98. All of the teeth 100 for the shaft 12 that are located between the full width teeth, are formed with a reduced tooth width. This may be done by shaving one side of the flank of each tooth as indicated in FIGURE 4. At the same time the maximum diameter of the teeth 140 is held in close tolerance with respect to the maximum diameter of the internal tooth spaces of the spline gear 160. This produces a piloting action between the maximum diameter of the teeth 140 and the base of the spline tooth spaces in the internal spline of the gear 60.

During torque delivery through the driveline, all torque is transmitted through the full-width spline teeth. The piloting action occurs on the maximum diameter addendum circle of the external spline teeth and the root circle diameter of the internal spline teeth.

Figure 5:
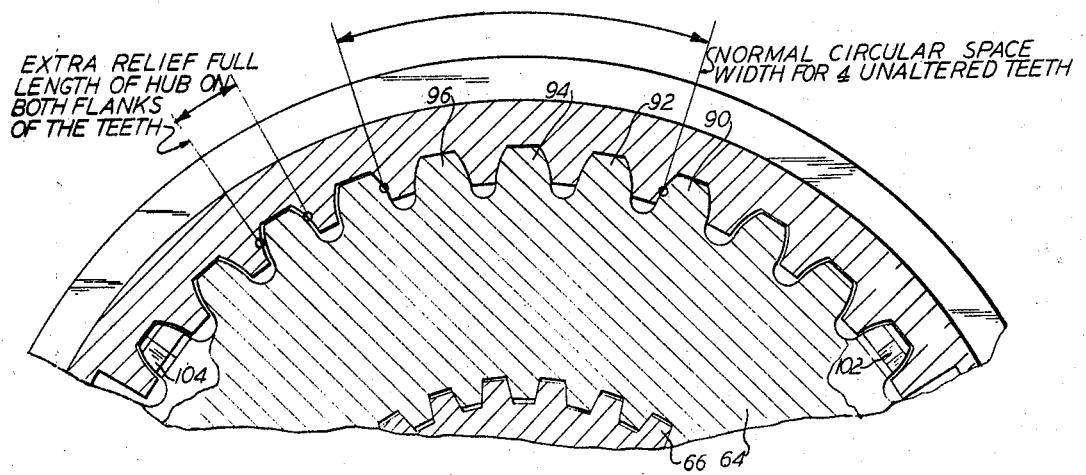
FIGURE 5 is a cross sectional view taken along section line 5—5 of FIGURE 3.

In FIGURE 5 there are five unaltered teeth that maintain full-line contact with the profile surfaces of the internal spline teeth of the synchronizer sleeve 76. All the other spline teeth of the hub 64 are relieved on both sides of the teeth. During operation under torque, the additional relieved spline teeth, unlike the spline of FIGURE 4, will be capable of delivering torque to complement the troque delivery through the unaltered spline teeth.

The pressure angle for the teeth shown in FIGURE 4 is 30°. Spline teeth shown at 90 through 98 engage internal spline teeth on the pitch circle for the external and internal teeth. Corresponding teeth are formed on portion 50 of the shaft 28 at location 180° away from the teeth 90 through 98. All the external spline teeth for shaft 28, located between the unaltered teeth, are formed with a reduced tooth width. This may be done by shaving one side of the flank of each tooth as indicated in FIGURE 4. At the same time, the maximum diameter of the teeth 140 is held in close tolerance with respect to the maximum diameter of the internal tooth spaces for the spline of gear 60. This produces the piloting action described earlier. As this piloting action occurs and as the full-width teeth serve as the torque delivery element, skewing of the gear 60 with respect to the axis of the shaft 28 is prevented. The gear 58 in the particular embodiment shown in FIGURE 1 is a helical gear, and the helical splines 50 are designed to establish an axial force during torque delivery that opposes the axial component of the gear force reaction of the gear.

Due to the piloting action and the ability of the unaltered teeth to accept driving torque, the gear 60 will not progressively walk with respect to the axis of the shaft 28 during operation as a result of the skewing action.

During coasting operation when torque is delivered from the driving wheels to the shaft 10, the full-width teeth accommodate all the driving torque. It is during this coasting operation, or reverse torque delivery, when the previously described gear "jump-out" problem is most severe.

The synchronizer hub splines register with the internal splines of the sleeve 76, which are modified as indicated in FIGURE 5, and these internal teeth move into registry with the dog clutch teeth 86 of the intermediate gear or the dog clutch teeth 88 for high speed ratio operation. A driving connection then is established between shaft 28 and either gear 58 or 26. Teeth 86 are relieved on one flank and each of the teeth 88 are relieved on the opposite flank. To effect alignment between the external teeth of the synchronizer hub and the dog clutch teeth 86 and 88 of the torque delivery gears, both of the flanks of the external hub teeth must be relieved as indicated in FIGURE 5. Torque is delivered from the sleeve to the hub through the full-width teeth on the hub. The teeth that are relieved on both flanks are chamfered as shown at 102 and 104 in FIGURE 5.

Because of the tendency of the sleeve to be piloted on the addendum circle, skewing of the sleeve during torque delivery in either one direction or the other does not occur. All the torque is delivered through the synchronizer hub to the synchronizer sleeve and from the sleeve to the hub through the full-width teeth. The tendency that often exists for the synchronizer sleeve to jump out of meshing engagement with the dog clutch teeth 86 and 88 thus is eliminated.

Although in the embodiments disclosed in this specification, the piloting action occurs between the maximum diameter of the external teeth and the maximum diameter of the internal teeth, the piloting action can also be made to occur between the minor diameters. This can be done simply by altering the clearance to provide a piloting action on the minor diameters rather than the maximum diameters.

Having thus described preferred forms of our invention, what we desire and claim to secure through U.S. Letters Patent is:

1. Torque delivery gearing comprising a first torque delivery member with external splines, a second torque delivery member with internal splines, said members being mounted for rotation about a common axis, said members being splined together and adapted for relative axial sliding movement, the majority of the spline teeth formed on one member having along their axial length a reduced arcuate tooth thickness less than that of the remaining few number of spline teeth thereon, said remaining few number of spline teeth on said one member being formed along the axial length thereof with a full tooth thickness which is substantially equal to the arcuate width of the majority of registering tooth spaces between adjacent spline teeth on the other member whereby full torque delivery between said members occurs through said few teeth, the apices of the other teeth of said one member being piloted on the root diameter of the other member during relative axial displacement of said members, said tooth thickness and arcuate width being measured along the pitch circle of said spline teeth.

2. The combination as set forth in claim 1 wherein the maximum diameter of the external spline teeth of one member register with and are piloted on the root circle diameter of the internal teeth of the other member thereby producing a major diameter sliding fit between said members.

3. The combination as set forth in claim 1 wherein one flank of each of said majority of spline teeth on said one member is relieved whereby said few teeth are capable of transferring torque between said members during torque delivery in one direction and all of the external spline teeth are capable of delivering torque in the opposite direction.

4. The combination as set forth in claim 1 wherein one flank of each of said majority of spline teeth on said one member is relieved whereby said few teeth are capable of transferring torque between said members during torque delivery in one direction all of the external spline teeth are capable of delivering torque in the opposite direction.

5. The combination as set forth in claim 1 wherein both of the flanks of said majority of teeth are relieved to produce a reduced circular tooth thickness for the external teeth of said one member.

6. The combination as set forth in claim 1 wherein both of the flanks of said majority of teeth are relieved to produce a reduced circular tooth thickness for the external teeth of said one member.

References Cited
UNITED STATES PATENTS

| | | | |
|---|---|---|---|
| 2,441,140 | 5/1948 | Fishburn | 192—70.19 |
| 2,457,942 | 1/1949 | Zandt | 287—52 X |
| 3,249,188 | 5/1966 | Maina | 192—67 |

HALL C. COE, Primary Examiner

U.S. Cl. X.R.

64—6; 192—67; 287—52

UNITED STATES PATENT OFFICE
CERTIFICATE OF CORRECTION

Patent No. 3,477,250                                                       November 11, 1969

Henry L. Gregorich et al.

It is certified that error appears in the above identified patent and that said Letters Patent are hereby corrected as shown below:

Column 3, line 70, beginning with "In FIGURE 4" cancel all to and including "of the gear 60." in line 14, column 4; same column 4, line 39, "140" should read -- 40 --. Column 5, line 36, cancel "the other"; same line 36, cancel "said", second occurrence.

Signed and sealed this 31st day of March 1970.

(SEAL)
Attest:

Edward M. Fletcher, Jr.                                      WILLIAM E. SCHUYLER, JR.
Attesting Officer                                                    Commissioner of Patents